US006577467B2

(12) United States Patent
Hoge et al.

(10) Patent No.: US 6,577,467 B2
(45) Date of Patent: Jun. 10, 2003

(54) HELICAL SCAN TRANSPORT FOR SINGLE REEL TAPE CARTRIDGE

(75) Inventors: David T. Hoge, Westminster, CO (US); William C. Dodt, Broomfield, CO (US); John C. Owens, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/059,915

(22) Filed: Jan. 28, 2002

(65) Prior Publication Data

US 2002/0105753 A1 Aug. 8, 2002

Related U.S. Application Data

(63) Continuation of application No. 08/377,450, filed on Jan. 24, 1995, now abandoned, which is a continuation of application No. 08/060,653, filed on May 13, 1993, now abandoned.

(51) Int. Cl.[7] .............................. G11B 15/67; G03B 1/56
(52) U.S. Cl. ........................ 360/85; 360/95; 242/332; 242/332.4; 242/348.3; 226/92
(58) Field of Search .................... 360/85, 95, 132; 242/332.7, 332.8, 332, 332.4, 332.1, 348, 348.3; 226/92

(56) References Cited

U.S. PATENT DOCUMENTS

| | | | | |
|---|---|---|---|---|
| 3,818,503 A | * | 6/1974 | Hosono et al. | 242/332 |
| 3,849,796 A | * | 11/1974 | Omiya et al. | 242/348 |
| 4,432,508 A | * | 2/1984 | Inoue et al. | 226/92 |
| 5,202,809 A | * | 4/1993 | Dodt et al. | 360/132 |
| 5,325,370 A | * | 6/1994 | Cleveland et al. | 360/53 |
| 5,374,003 A | * | 12/1994 | Hoge et al. | 242/332.7 |
| 5,478,021 A | * | 12/1995 | Davis et al. | 242/332.1 |
| 5,629,815 A | * | 5/1997 | Cheatham et al. | 360/84 |

FOREIGN PATENT DOCUMENTS

JP 6-274985 * 9/1994

OTHER PUBLICATIONS

"Single Reel Tape Cartridge for Helical Scan Drive—has leader block and tape onto second reel unreeled before tape is drawn adjacent helical scan drive" Nov. 10, 1987, Research Document 283069 A.*

* cited by examiner

Primary Examiner—William Klimowicz
(74) Attorney, Agent, or Firm—Wayne P. Bailey

(57) ABSTRACT

A helical scan transport apparatus for reading and writing data on to a magnetic recording tape which is wound on a supply reel rotatably mounted within a removable tape cartridge includes a chassis having a front end portion and rear end portion. An elevator assembly is mounted on the chassis at the front end. The elevator assembly is configured to receive the tape cartridge and to position the tape cartridge in a loaded position. A take-up reel assembly is coupled to the chassis at the rear end position. A helical deck is mounted on a central portion of the chassis between the elevator assembly and the take-up reel assembly. The helical deck includes a rotary read/write head, a substantially linear tape loading path between the elevator assembly and the take-up reel assembly, and a movable guide for the seizing the tape from the tape loading path and for at least partially wrapping the tape around the rotary head. A linear threading mechanism is configured to grasp the leader block of the tape, thread the tape through the tape loading path of the helical deck, and couple the leader block to the take-up reel assembly. The helical transport has a form factor compatible with the Storage Technology Corporation Model 4400 Automated Cartridge System.

7 Claims, 11 Drawing Sheets

HELICAL SCAN TRANSPORT FOR SINGLE REEL TAPE CARTRIDGE

This is a continuation of application(s) Ser. No. 08/377,450 filed on Jan. 24, 1995, now abandoned. Ser. No. 08/060,653 filed on May 13, 1993, now abandoned.

BACKGROUND OF THE INVENTION

1. Field of the Invention

The invention relates generally to the storage of data on magnetic recording tape, and more specifically, to the storage of digital data in helical format on a magnetic tape housed within a single reel tape cartridge.

2. Related Art

The data processing industry stores large amounts of digital data on magnetic tapes. The 3480 tape cartridge (developed by IBM Corporation, Armonk, N.Y., U.S.A.) is an industry standard for magnetic storage media. The 3480 cartridge is a single reel cartridge with a length of ½ inch wide magnetic tape stored on it. The cartridge housing protects the tape from damage while allowing the tape reel to be driven from a drive mechanism on the underside of the cartridge housing. The tape is withdrawn from an opening formed at one corner of the cartridge. A leader block attached to a free end of the tape allows the tape to be withdrawn from the cartridge for read/write operations.

Read/write operations are performed by a tape "transport." The standard tape transport accepts the tape cartridge into an elevator assembly. A threading mechanism grabs the leader block and pulls it free from the cartridge. The leader block is then used to thread the tape through a series of guide posts, across a longitudinal read/write head, and into a slot in a take-up reel. Once threaded, the tape from the cartridge can be driven across the read/write heads for data transfer operations.

The standard 3480 cartridge contains 541 feet of tape. Data is stored on the tape in an 18 track format, typically providing approximately 200 MB (megabytes) of data storage capacity.

For automated storage and handling of large numbers of 3480 cartridges, automated mass storage systems have been developed. For example, the 4400 automated cartridge system (ACS) from Storage Technology Corporation, Louisville, Colo., U.S.A., is capable of storing up to 6,000 3480 cartridges. The 4400 ACS can quickly locate a selected cartridge and load it into a cartridge transport for read/write operations. The Model 4400 ACS typically has between one and four cartridge transports associated with it.

The 4400 ACS has proven to be a cost-effective data storage system. With each of 6,000 cartridges providing 200 megabytes of storage capacity, one 4400 ACS has a total capacity of 1.2 terabytes ($1.2 \times 10^{12}$ bytes). This storage capacity is provided in a unit that occupies approximately 100 square feet of floor space. Nevertheless, it is desirable to increase the storage density of the 4400 ACS.

Data is currently stored on a 3480 cartridge in an 18 track longitudinal format. However, it is known in the industry that using a helical scan data storage format would allow approximately a 100 times increase in storage capacity. In other words, the typical 3480 cartridge would have a helical scan storage capacity of 25 gigabytes rather than the 200 megabytes of the longitudinal format. At 25 gigabytes per cartridge, the 4400 ACS would provide a total storage capacity of 150 terabytes. Thus, helical-scan technology holds promise for increasing the storage capacity of the 4400 ACS by a factor of greater than 100 by simply changing the format with which data is stored in each tape cartridge.

Changing the data storage format for a cartridge necessitates that a new transport be developed. Helical scan transports have gained widespread use in the video industry. However, a helical-scan transport for a one-half inch tape cartridge is not currently commercially available.

The helical scan transport is quite different than the longitudinal style transport. The helical scan transport includes a cylindrical rotating head around which the tape must be wrapped for read/write operations. The helical scan tape path is much more complex than the path for longitudinal transports.

The video industry has adopted a two reel magnetic tape cassette as its standard media. Loading of the tape from a cassette through the tape path of a helical scan transport is straightforward and well known in the art. The loading of tape from a cartridge through a helical scan tape path, however, is more difficult and has not been developed to the level of that for a cassette. Thus, two standard and distinct media form factors have developed for the video industry and the data processing industry. The form factors are incompatible. 3480 style cartridges cannot be used with the helical-scan cassette transports of the video industry.

One apparent reason for the data processing industry's selection of the cartridge as its standard data storage media is volumetric economy. By not including a take-up reel, the cartridge is roughly one-half the size of a cassette for the same tape length. Thus, a cartridge has twice the storage capacity per unit volume of a cassette.

While a helical-scan transport is not commercially available for a one-half inch tape cartridge, one is described in commonly owned U.S. Pat. No. 5,128,815 to Leonhardt et al. Leonhardt et al. teach positioning a cartridge and a take-up reel in a helical transport so that a cassette is emulated. This simplifies tape loading. However, such a design would have a form factor incompatible with the 4400 ACS. That is, the physical layout and dimensioning would not allow the resulting transport to be used with existing 4400 ACS equipment without substantial modification. This is a critical concern in the computer and data processing industry. New technologies and advancements must be compatible with existing technologies. For example, to have maximum utility, a helical-scan transport must have a form factor compatible with the 4400 ACS environment.

An important feature of the form factor of such a transport is the frontal surface area. That is, the front face of the transport which contains the opening for accepting a tape cartridge must be small enough to interface with other equipment. Form factors such as that disclosed by Leonhardt et al. in the '815 patent may have too large a frontal area for many applications because of the side-by-side arrangement of the cartridge and the take-up reel.

What is needed is a helical scan transport which can store data on and retrieve data from a 3480 or similar data cartridge and which has a form factor compatible with existing data storage systems (e.g., the Storage Technology Corporation Model 4400 ACS).

SUMMARY OF THE INVENTION

The invention is a helical scan transport for a magnetic tape cartridge. The transport has a substantially linear tape loading path and a form factor which allows its use with a Storage Technology Corporation Model 4400 automated cartridge system (also known as a data cartridge storage "library"). A new helical scan tape cartridge was developed for use with the transport of the invention. The helical cartridge has a form factor similar to the 3480 style cartridge. Thus, the 4400 ACS can store both the helical cartridges and the 3480 style cartridges. By producing a helical scan transport and helical cartridge which are compatible with existing automated cartridge systems, the data storage capacity of existing systems can be vastly increased without the need for retrofitting or otherwise modifying existing systems.

The helical scan transport apparatus of the invention includes a chassis having a front end portion and a rear end portion. An elevator assembly is mounted on the chassis at the front end. The elevator assembly is configured to receive a tape cartridge and to position the tape cartridge in a loaded position. A take-up reel assembly is coupled to the chassis at the rear end portion. A helical deck is mounted on a central portion of the chassis between the elevator assembly and the take-up reel assembly. The helical deck includes a rotary read/write head, a substantially linear tape loading path between the elevator assembly and the take-up reel assembly, and movable guides for seizing the tape from the tape loading path and for at least partially wrapping the tape around the rotary head. A linear threading mechanism is configured to grasp the leader block of the tape, thread the tape through the tape loading path of the helical deck, and couple the leader block to the take-up reel assembly.

In the preferred embodiment, the helical deck is taken from a commercially available Panasonic Model D350 digital video cassette recorder. Also in the preferred embodiment, the helical transport is dimensioned to fit within a rectangular enclosure measuring approximately 12.5" (inches) wide by 26.5" deep and configured such that a plurality of the transport apparatuses may be stacked within the enclosure with a vertical spacing of 11.06" on center. The front end portion of the chassis extends 7.0" outward from the enclosure and is configured to mate with the 4400 automated cartridge system when the enclosure is coupled to a housing of the 4400 automated cartridge system.

The rectangular enclosure is a frame assembly configured to enclose up to four of the helical transports of the invention. The enclosure measures 26.5" inches deep by 28.0 inches wide by 67.775 inches high (not including castors). The enclosure houses each transport and its associated electronic circuitry in a side-by-side arrangement. The transport fills approximately 12.3" of the width and the remaining width is available for a power supply and the electronic circuitry associated with the transport.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
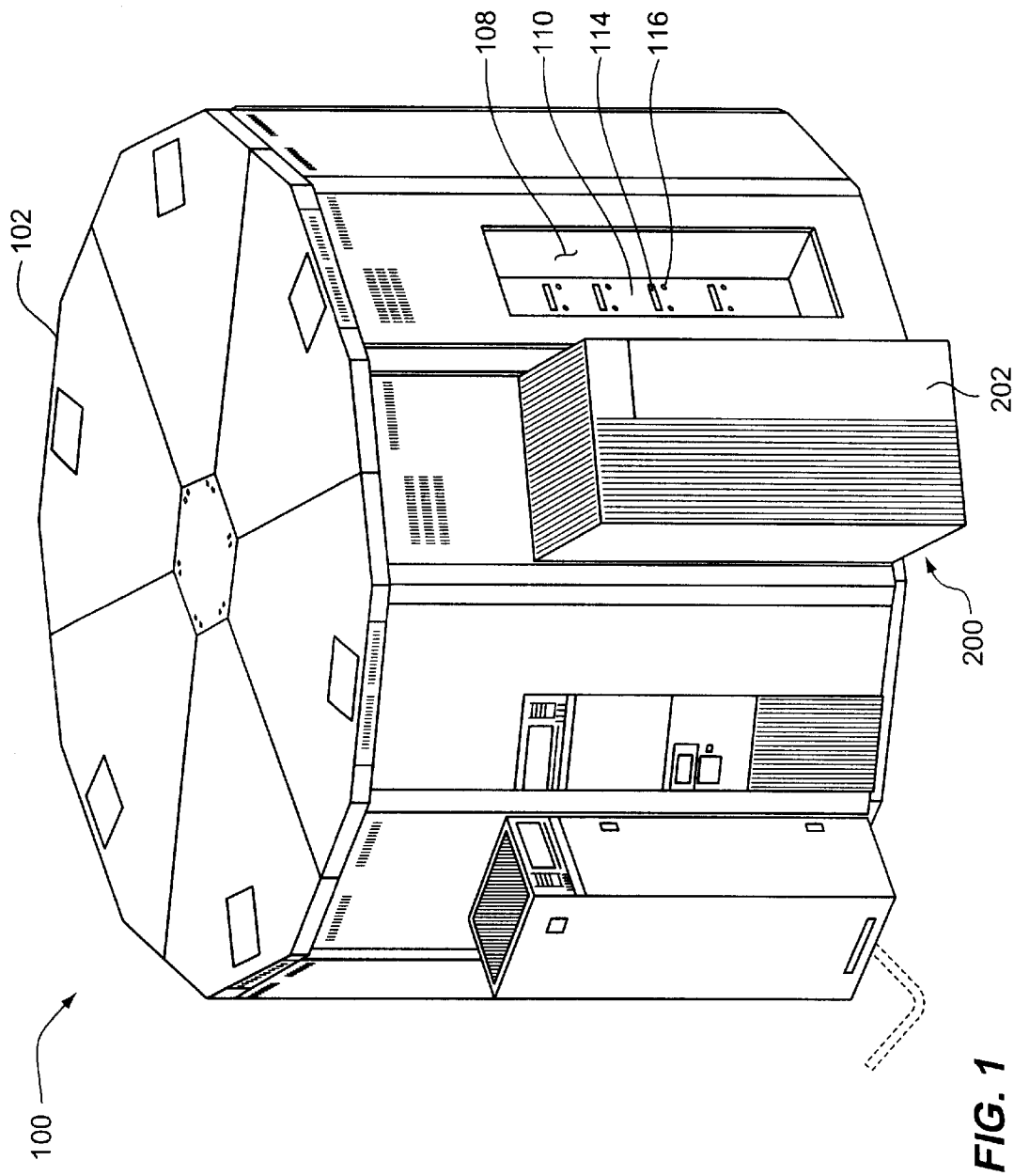
FIG. 1 is a perspective view of a Storage Technology Corporation Automated Cartridge System (ACS).

The preferred embodiment of the invention is discussed in detail below. While specific part numbers and configurations are discussed, it should be understood that this is done for illustration purposes only. A person skilled in the art will recognize that other components and configurations may be used without departing from the spirit and scope of the invention.

The invention is a helical scan transport for a magnetic tape cartridge. The transport has a substantially linear tape loading path and a form factor which allows its use with a Storage Technology Corporation Model 4400 automated cartridge system or ACS. The transport is dimensioned to fit within a rectangular enclosure (i.e., a cartridge drive unit) measuring approximately 28" wide by 26.5" deep and configured such that a plurality of the transports may be stacked within the enclosure with a vertical spacing of 11.06" on center. The transport itself is 12.3" wide. The additional space is used for the associated electronic circuitry. The transport includes a front end portion (for receiving a helical data cartridge) which extends outward 7" from the enclosure. The front end portion of the transport is configured to mate with the 4400 automated cartridge system when the enclosure is coupled to a housing of the 4400 automated cartridge system.

The inventors have discovered that the costs involved with developing a helical scan transport for a single reel cartridge are prohibitive. Development of the required head assembly, servo controls, and data path (i.e., read/write electronics between the head assembly and the input/output data channels) are extremely high. This may account for the fact that such a device is not commercially available. In overcoming this problem, the inventors have further discovered that a double reel cassette type helical scan video transport could be adapted to produce a single reel cartridge transport which meets the required form factor for use with a 4400 ACS. By using the head assembly, the servo controls and the data path from the video transport, development costs were minimized and time to market was greatly reduced. The resulting helical scan transport allows the storage capacity of the 4400 ACS to be increased from approximately 1.2 terabytes to approximately 150 terabytes. This is over a 100 times increase in storage capacity without requiring modification to the 4400 ACS.

A new helical scan tape cartridge was developed for use with the transport of the invention. The helical cartridge has a form factor similar to the 3480 cartridge. Thus, the 4400 ACS can store both helical cartridges and 3480 cartridges. By producing a helical scan transport and helical cartridge which are compatible with existing automated cartridge systems, the data storage capacity of existing systems can be vastly increased without the need for retrofitting or otherwise modifying existing systems.

In addition, the new helical transport and helical cartridge can coexist in a 4400 ACS environment with the 4480 transport (and other Model 4400 ACS compatible longitudinal-format transports) and the 3480 cartridge. The helical cartridges bear identification marking so that the 4400 ACS can distinguish a helical cartridge from a 3480 cartridge and route each cartridge to an appropriate transport.

The helical transport of the invention is now described with reference to the figures. The 4400 ACS is indicated in FIG. 1 by reference number 100. ACS 100 includes a housing 102. Housing 102 is a substantially circular shaped housing having twelve substantially flat sides. Each side is approximately 36 inches wide. The overall housing 102 is approximately 128 inches in diameter and 92 inches high. For a more detailed discussion of the 4400 ACS, see U.S. Pat. Nos. 4,864,511, 4,928,245, and 4,932,826 to Moy et al. The full text of each of the '511, '245, and '826 patents is hereby incorporated by reference. As described in these patents, housing 102 encloses a robot assembly and a plurality of data cartridge storage cells or bins 118 (see FIG. 2).

Coupled to a side of housing 102 is a cartridge drive assembly 200. Cartridge drive assembly 200 includes a frame assembly 202 for housing a plurality (e.g., four) of helical cartridge transports 204 (not shown in FIG. 1). Cartridge drive unit 200 mates with a side of housing 102 via a drive opening 108. Drive opening 108 is a substantially rectangular recess approximately 50 inches high by 16 inches wide by 7 inches deep. A rear wall of opening 108 forms a template 110. Template 110 includes a plurality of cassette openings 114 and locating holes 116.

Figure 6:
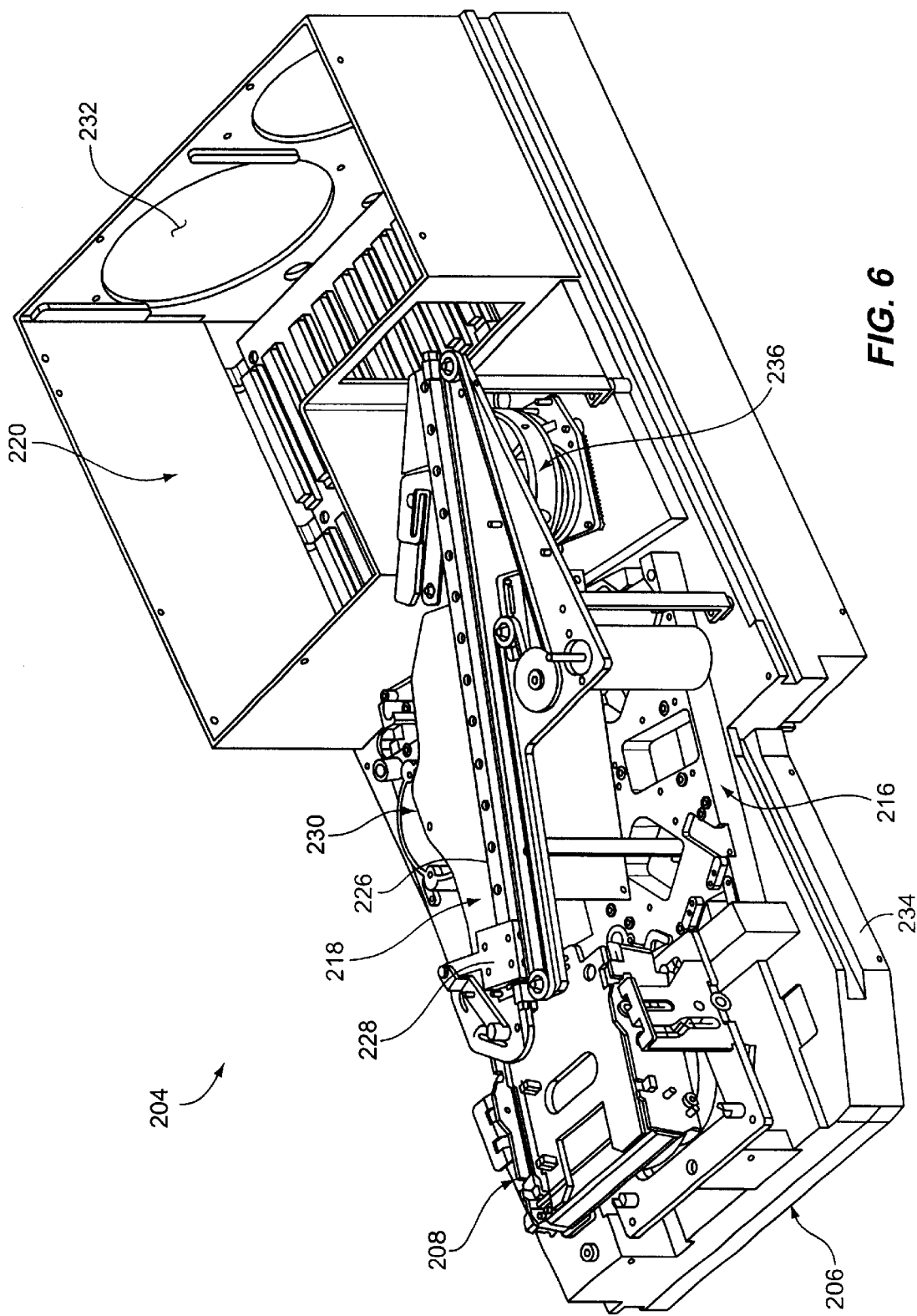
FIG. 6 is a perspective view of the helical transport of the invention.

Template 110 is configured to mate with each transport 204 so that cartridge opening 114 mates with a front face 206 of cartridge transport 204 and a cartridge may be passed through opening 114 and into an elevator assembly 208 (see FIG. 6). Locating holes 116 are configured to mate with alignment pins 210 (see FIG. 3) of cartridge transport 204.

Figure 2:
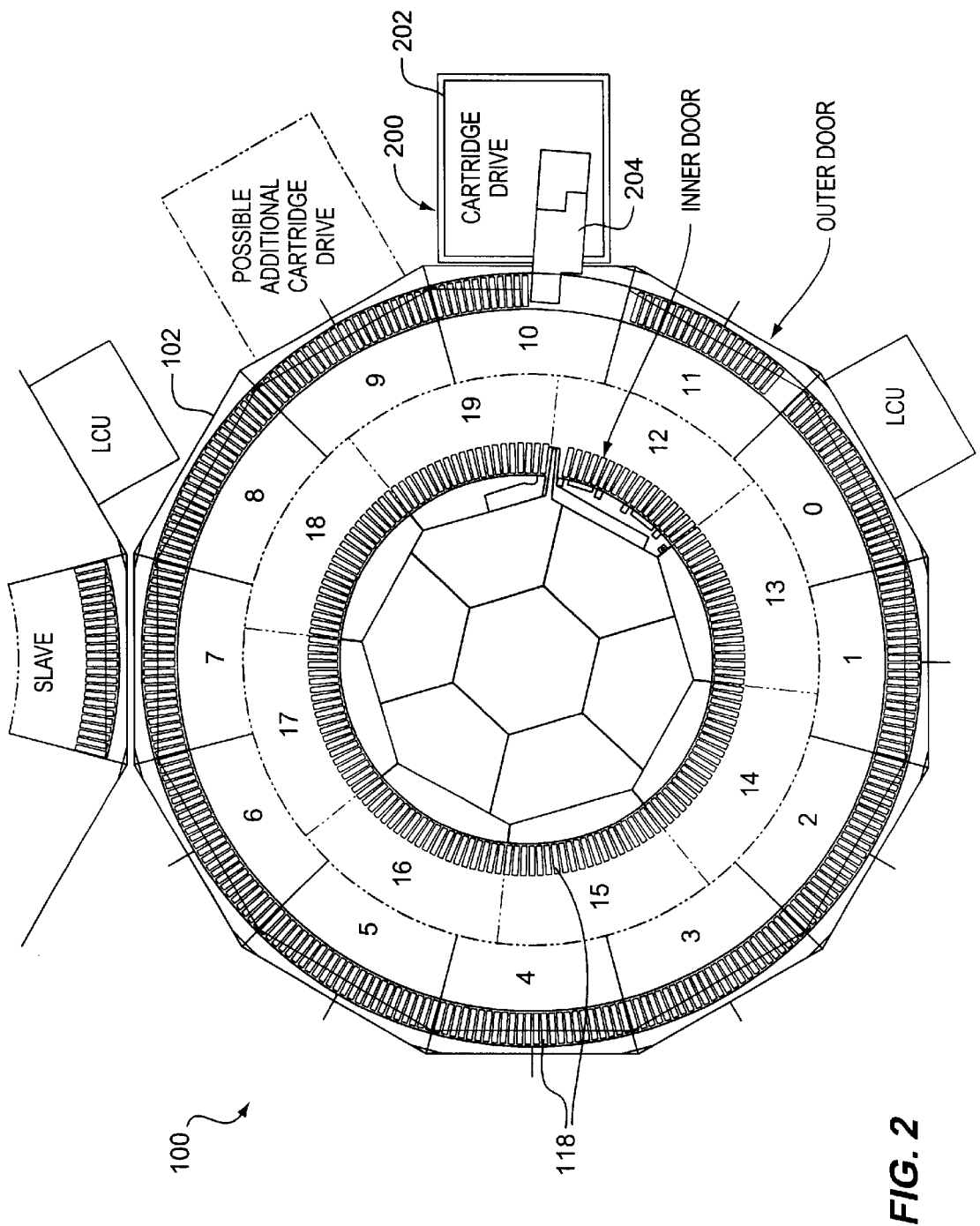
FIG. 2 is a top cross-sectional view of the Automated Cartridge System of FIG. 1.

FIG. 2 is a cross-sectional top view of ACS 100 showing ACS housing 102 and cartridge drive unit 200. Cartridge transport 204 is illustrated within cartridge drive unit 200. A plurality of cartridge storage bins 118 within housing 102 are also depicted.

Figure 3:
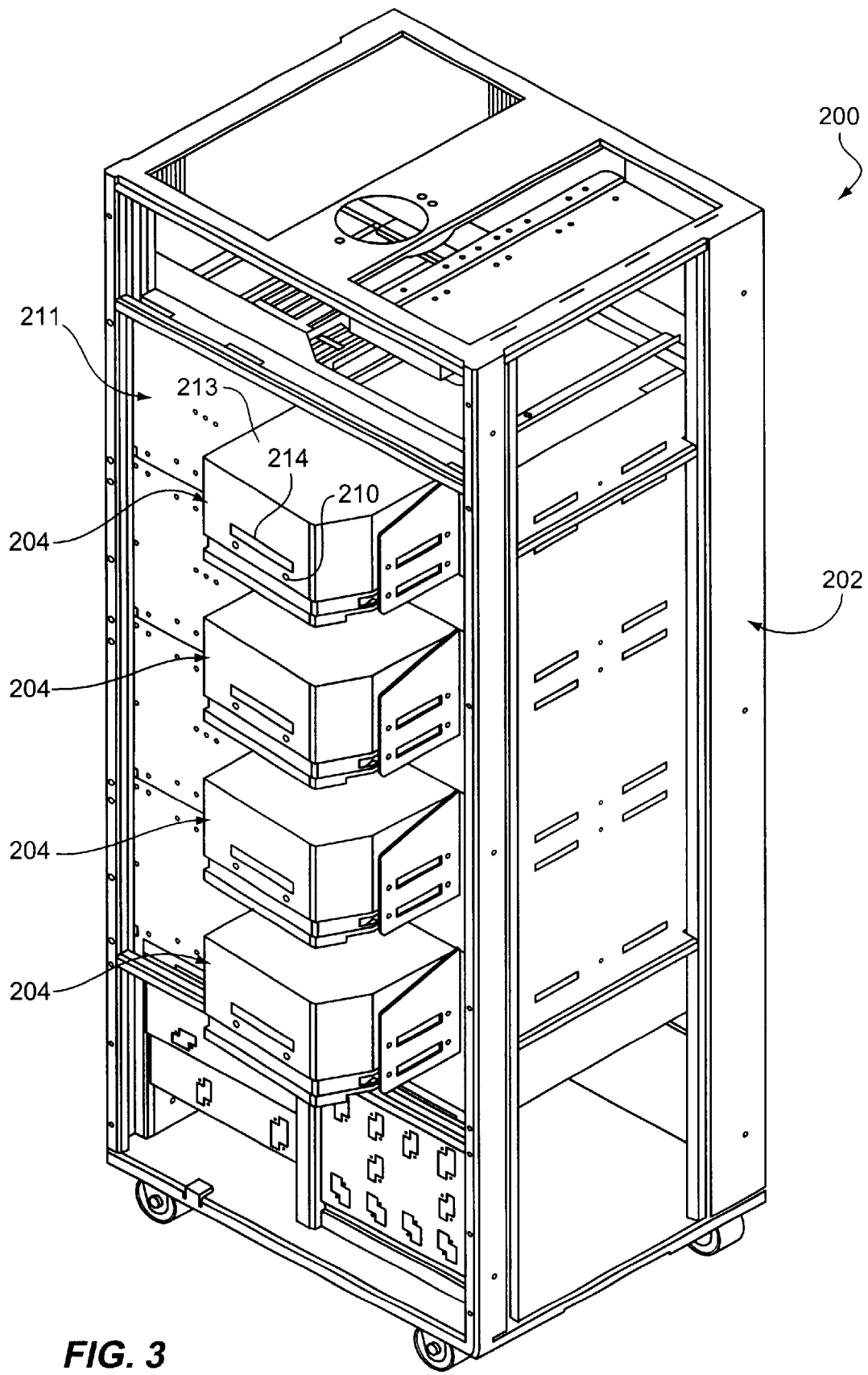
FIG. 3 is a perspective view of a cartridge drive unit of the invention.

FIG. 3 is a perspective view of cartridge drive unit 200 with the side and top panels removed from frame assembly 202. Four cartridge transports 204 are shown mounted within frame assembly 202. Note that front face 206 of each cartridge transport 204 is covered by a dust cover 213 which includes an opening 214 configured to accept passage of a tape cartridge into elevator assembly 208. Frame assembly 202 is configured to accept mounting of one, two, three or four cartridge transports 204.

Note that transports 204 extend out from the front face of cartridge drive unit 200 for mating with template 110 of ACS 100. Note also that transports 204 are located to the right side of frame assembly 202. Much of the electronic circuitry for each transport 204 is positioned in frame assembly 202 to the left side of each transport 204 in an electronics area 211. This is further illustrated in FIGS. 4 and 5.

Figure 4:
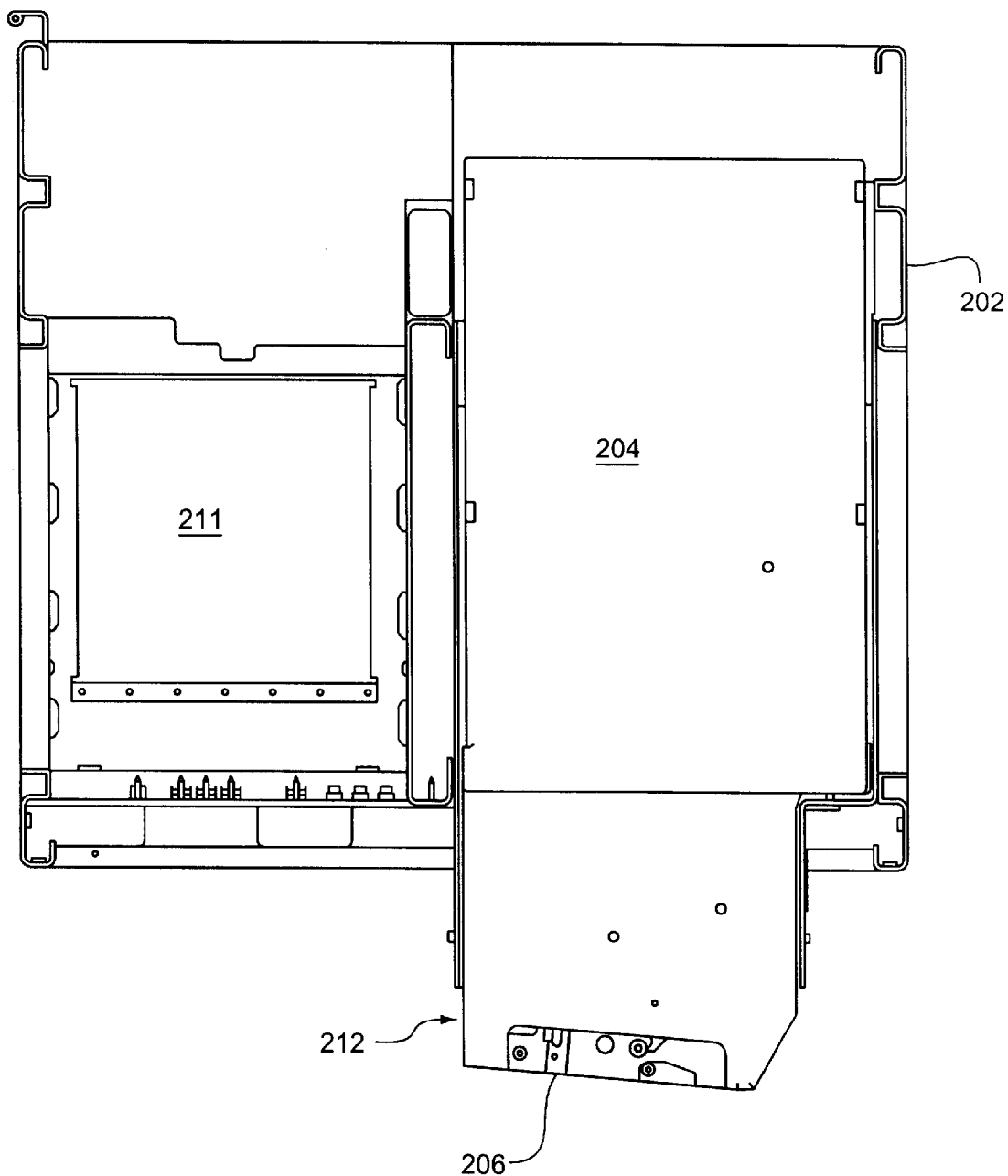
FIG. 4 is a top view of a cartridge drive unit of the invention illustrating a helical transport and its associated electronics mounted within the frame assembly.
Figure 5:
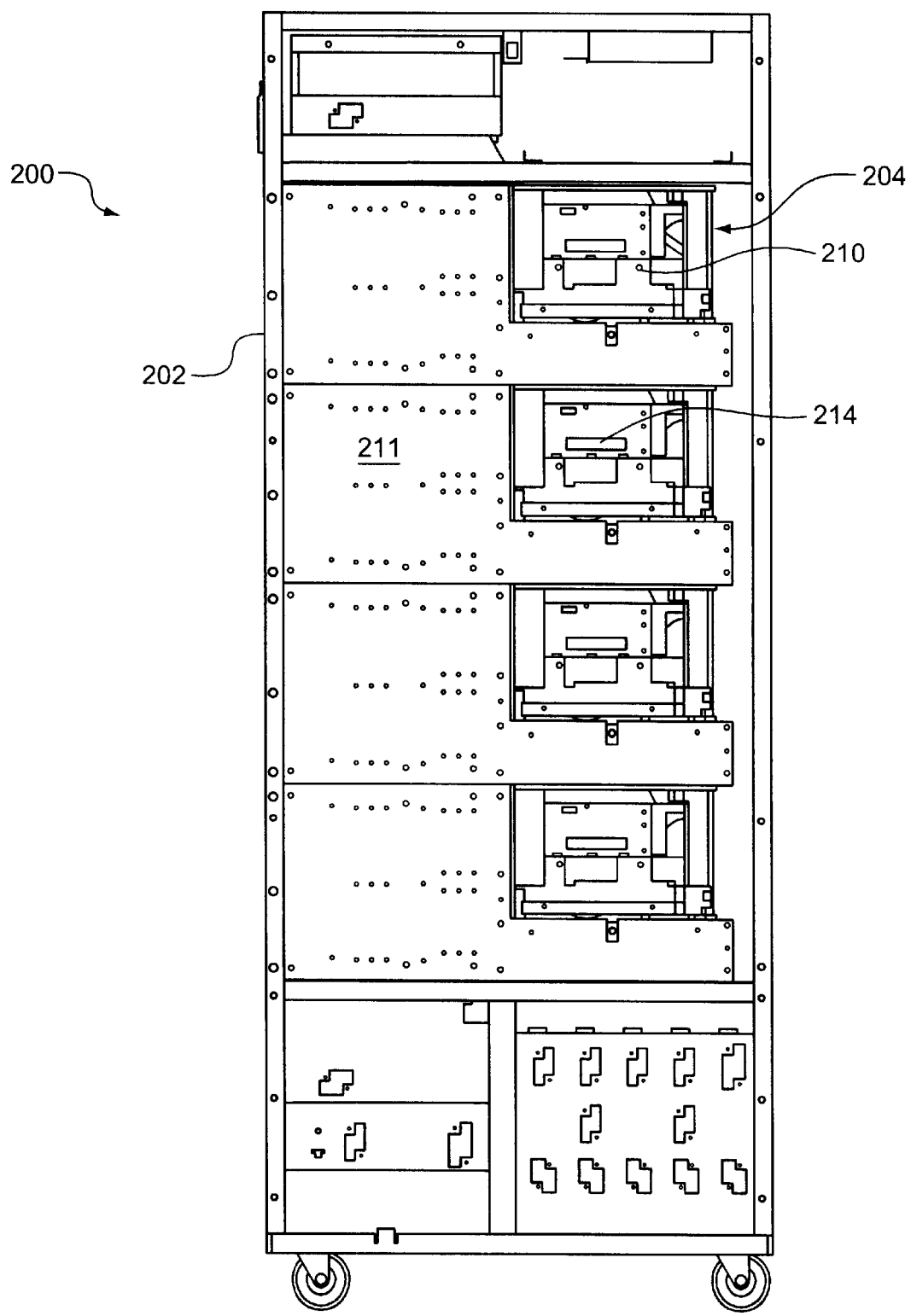
FIG. 5 is a front view of a cartridge drive unit of the invention illustrating four helical transports mounted within the frame assembly.

FIG. 4 is a cross-sectional top view and FIG. 5 is a front view of cartridge drive unit 200. Cartridge drive unit 200 is 26.5" deep by 28" wide by 67.8" high (not including casters). Cartridge drive unit 200 is configured to mate with ACS housing 102 without physically interfering with other ACS subsystems which may be part of or coupled to housing 102. These include slave ACS's, additional cartridge drives, control units, and access doors.

In order for the helical transport 202 of the invention to be compatible with cartridge drive unit 200 and ACS 100, transport 202 must fit within frame assembly 204. Front end 212 of transport 202 must extend approximately 7" out from frame assembly 202. In addition, the height of each transport 204 must be limited so that a vertical distance of 11.08" inches is maintained between alignment pins 210 of adjacently stacked transports 204. This will allow the front faces 206 of the transports 204 to precisely mate with the cartridge openings 114 and locating holes 116 in drive opening 108 of ACS housing 102.

Figure 7:
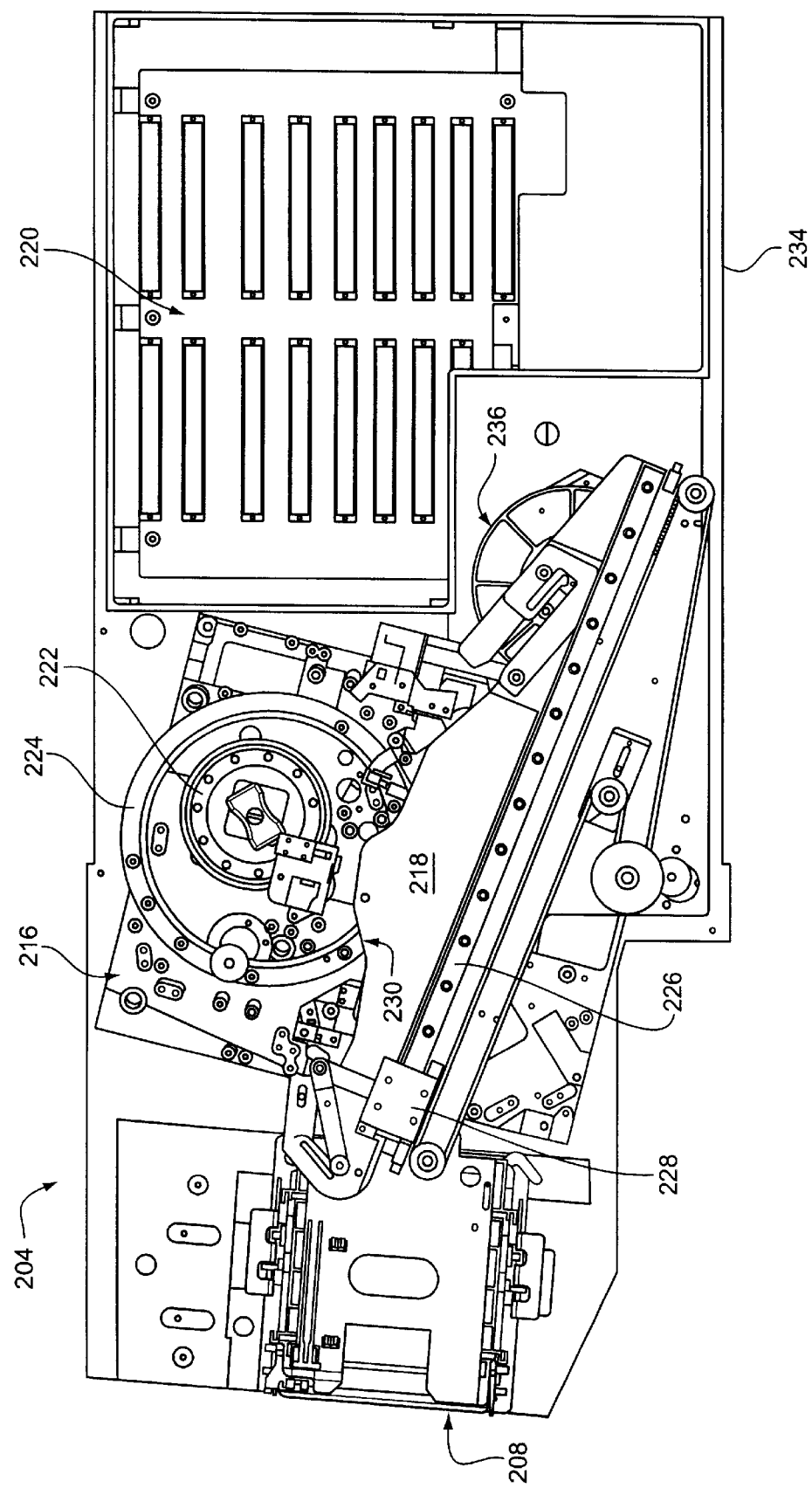
FIG. 7 is a top view of the helical transport of the invention.
Figure 8:
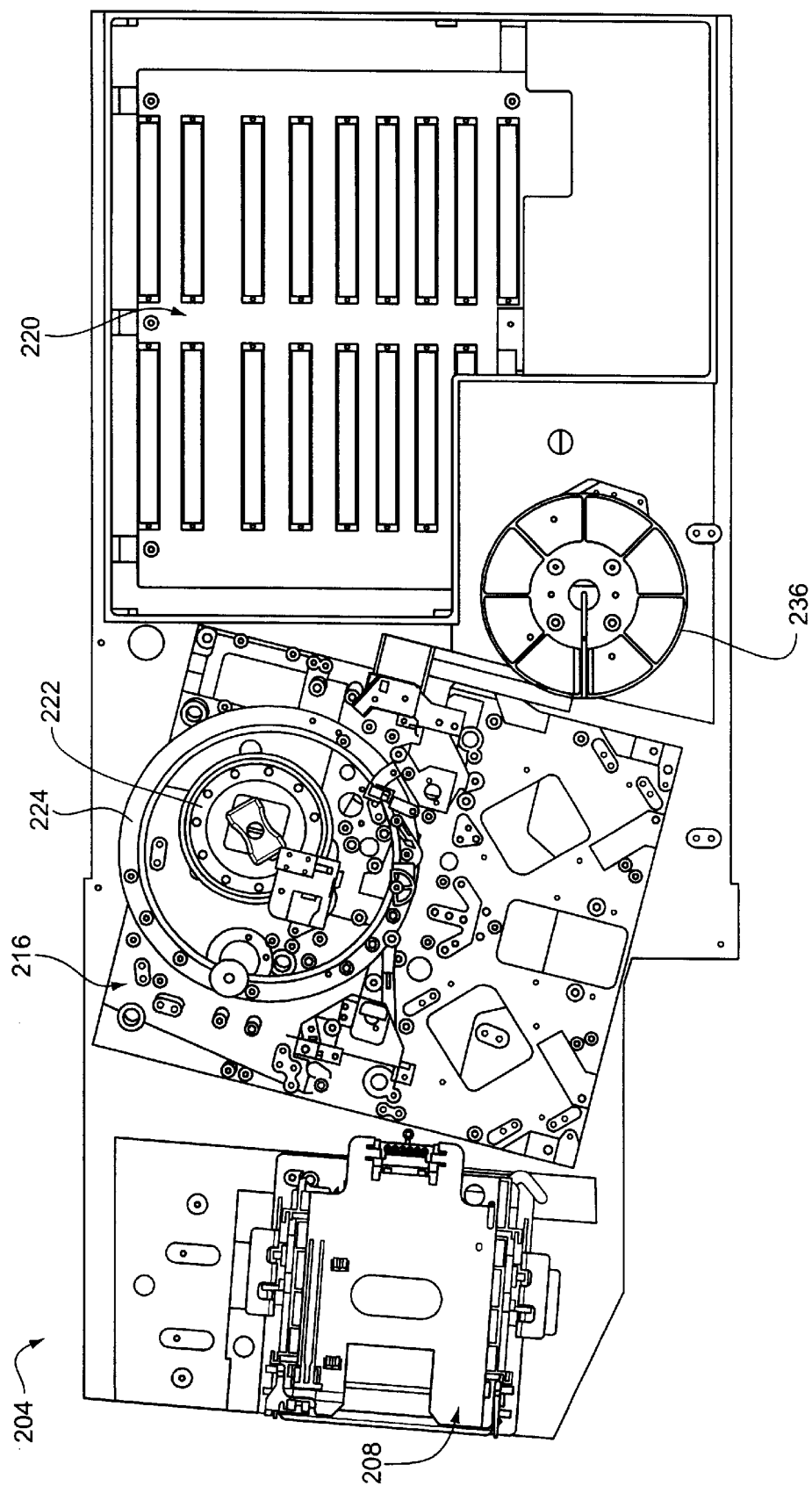
FIG. 8 is a top view of the helical transport of the invention with the linear tape threading mechanism removed.
Figure 9:
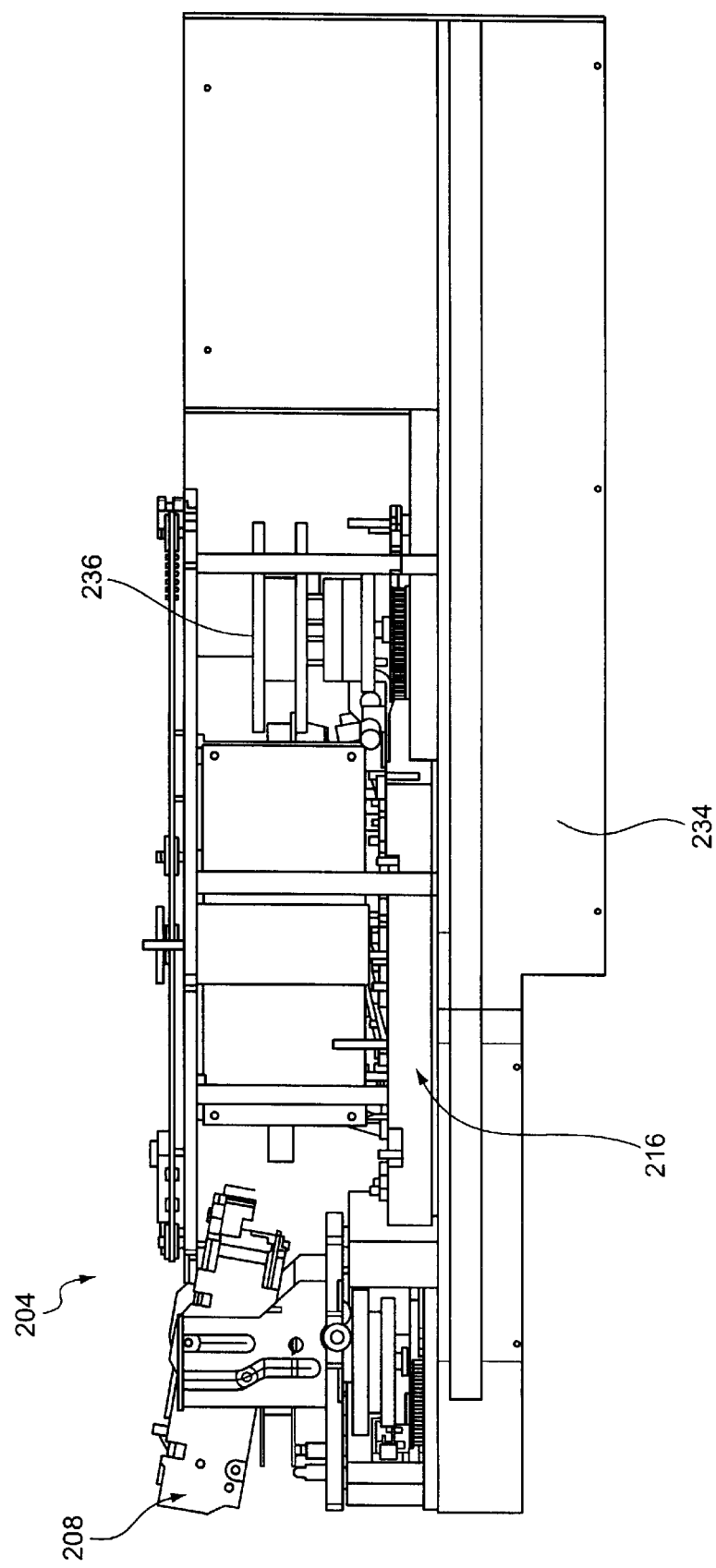
FIG. 9 is a right side view of the helical transport of the invention.
Figure 10:
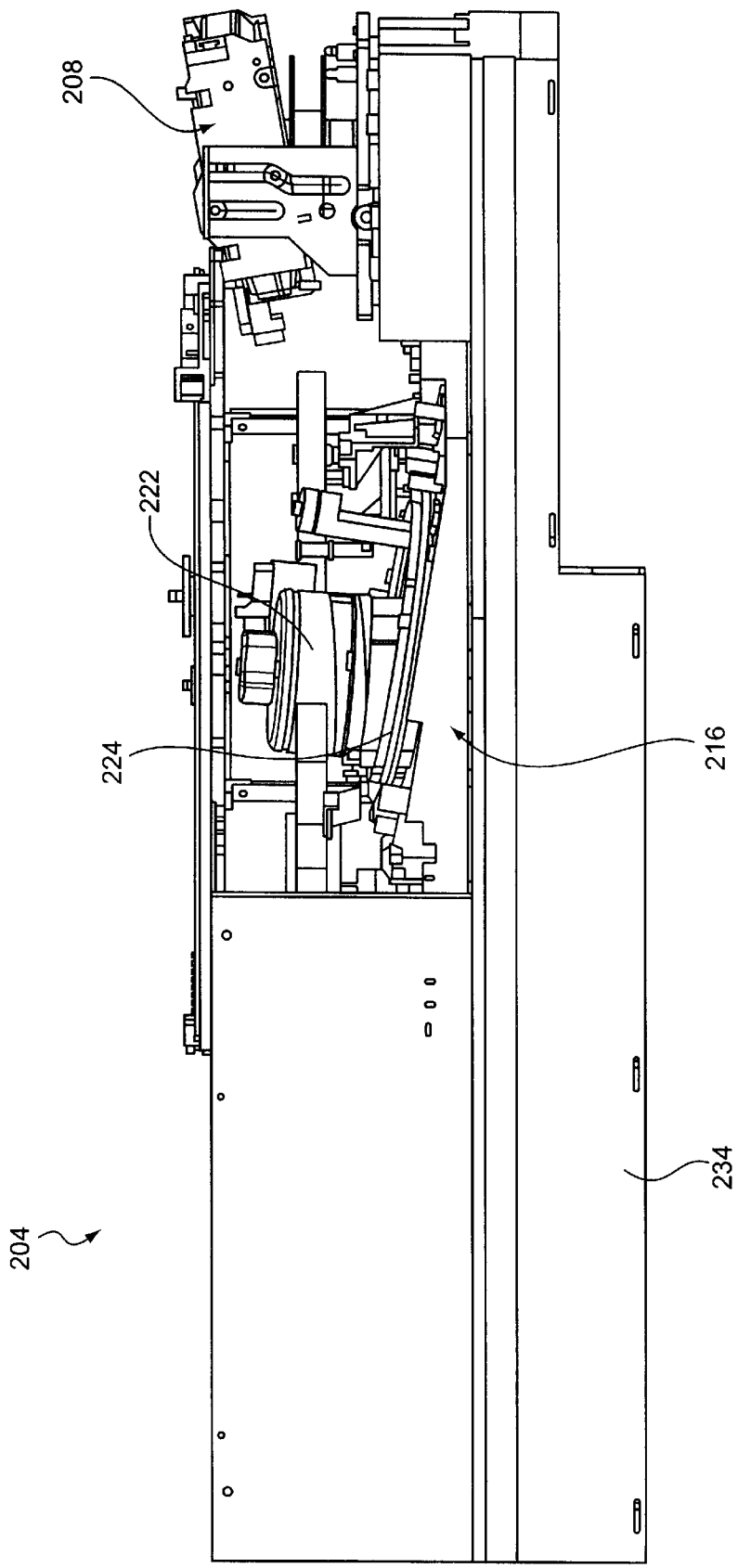
FIG. 10 is a left side view of the helical transport of the invention.

The helical scan transport of the invention is now described in detail with reference to FIGS. 6–10. FIG. 6 is a perspective view, FIG. 7 is a top view, FIG. 9 is a right side view, and FIG. 10 is a left side view of helical scan transport 204. FIG. 8 is a top view of transport 200 with linear threading mechanism 218 removed. Transport 200 includes an elevator assembly 208, a helical deck 216, a take-up reel 236, a linear threading mechanism 218, a circuit card area 220, and a transport chassis 234. Elevator assembly 208 is configured to receive a tape cartridge and to load the cartridge into transport 204. Helical deck 216 includes a rotary scan head 222, a loading ring 224, and a plurality of guide posts and capstans which make up a tape path (discussed below).

Linear threading mechanism 218 includes a linear bearing 226, a threading arm 228, and a threading cam 230. Linear threading mechanism 218 is described in detail in commonly owned, co-pending U.S. Pat. No. 5,333,810, filed concurrently herewith, titled "Raised Linear Threading Mechanism for a Tape Transport System," and naming as inventors David T. Hoge and John C. Owens, which is incorporated herein by reference. Similarly, the servo-control of linear threading mechanism 218 is described in detail in commonly owned, co-pending U.S. Pat. No. 5,325,028, titled "System and Method for Magnetic Tape Leader Block Extraction," and naming as inventor Bruce McWilliams Davis, which is incorporated herein by reference.

Circuit board area 220 includes a plurality of D-type printed circuit board connectors for connecting to a plurality of printed circuit board containing electronic circuitry for transport 204. An opening 232 in chassis 234 is configured to accept mounting of a muffin fan for cooling the electronic circuitry of transport 204.

As discussed above, designing and developing a helical deck such as helical deck 216 is an expensive and time consuming process. Helical deck 216 includes a tape path and associated guides, a supply reel drive assembly (not shown), a take-up reel assembly, and all associated servo control circuitry. Helical deck 216 further includes complex electronic circuitry associated with the read/write data path. In order to bypass the expense and difficulties in developing a custom helical deck, the inventors have taken helical deck 216 from a commercially available device and adapted it for use in helical transport 204.

In the preferred embodiment of the invention, helical deck 216 is taken from an AJ-D350 ½" digital studio video tape recorder available from Panasonic Broadcasts Systems Co., Secaucus, N.J. The Panasonic D350 is a video tape recorder configured to be used with ½" video cassettes. It will not accept a 3480 tape cartridge. Accordingly, the inventors have taken only the helical deck (including the read/write electronics, data path, servo controls and motors, and the associated electronic circuitry) from the Panasonic D350. For a detailed technical discussion of the D350, see John Watkinson, *The D-3 Digital Video Recorder*, Focal Press, 1992, which is incorporated herein by reference.

Essentially, the inventors have produced a transport configuration which will allow the D350 deck to be used with a tape cartridge while maintaining a form factor compatible with the Storage Technology Corporation Model 4400 ACS. A cartridge loading mechanism (elevator assembly 208) and a tape threading mechanism (linear threading mechanism 218) work together in providing the tape to helical deck 216 in a format such that helical deck 216 "sees" a cassette. Once the tape is pre-loaded through the tape path by linear threading mechanism 218, tape control can then be turned over to the D350 helical deck.

Because the Panasonic D350 helical deck was designed to work with a tape cassette, the servo controls were designed to feed tape from a supply reel of a cassette in a counterclockwise direction and to wind the tape on a take up reel (within the cassette), also in a clockwise direction. The standard 3480 cartridge, however, requires that the supply reel be turned in a counter clockwise direction to feed the tape. Accordingly, in order to use the servo control circuits and motors of the Panasonic D350, a new tape cartridge had to be developed.

The new helical cartridge has essentially the same dimensions and features as the 3480 cartridge. However, the helical cartridge feeds tape from the take-up reel when it is turned in a clockwise direction. Thus, the tape feeds from a front, left-side corner of the cartridge rather than a front, right-side corner as in the 3480 cartridge. Since the dimensions and other features of the helical cartridge are substantially the same as the 3480 cartridge, the helical cartridge may be used in the Model 4400 ACS. The helical cartridge is detailed in co-pending and commonly owned U.S. patent application Ser. No. 07/870,576, filed on Apr. 17, 1992, and titled "Magnetic Tape Cartridge for Helical Scan Transport," which is incorporated herein by reference.

The 3480 cartridge and the new helical cartridge have the same essential dimensions and features. Therefore, they are hereafter referred to as "3480-style" cartridges.

The new cartridge will bear identification markings so that ACS 100 can distinguish the helical cartridges from the 3480 cartridges and route each cartridge to an appropriate transport. Thus, helical transport 204 may coexist in an ACS 100 environment with other transports (e.g., the Storage Technology Corporation 4480).

In order to meet the conflicting requirements of producing a helical transport (1) with a form factor compatible with ACS 100, (2) which uses a tape cartridge compatible with ACS 100 (i.e., can be stored in bins 118 and manipulated by a robot mechanism of the ACS); and (3) which uses a commercially available helical deck; the components of helical transport 204 were configured and arranged as illustrated in FIGS. 7–10. The dimensions of the preferred embodiment are shown in FIG. 11.

Note that the motor which drives the supply reel of the tape cartridge has been relocated off of helical deck 216 to a position beneath elevator assembly 208 at the front of transport 204. Similarly, the motor which drives take-up reel 236 has been moved off of helical deck 216 to a position to the rear of helical transport 204. It is this arrangement which provides a substantially linear tape pre-load path to linear threading mechanism 218 and allows helical transport 204 to meet the form factor requirements of ACS 100.

Figure 11:
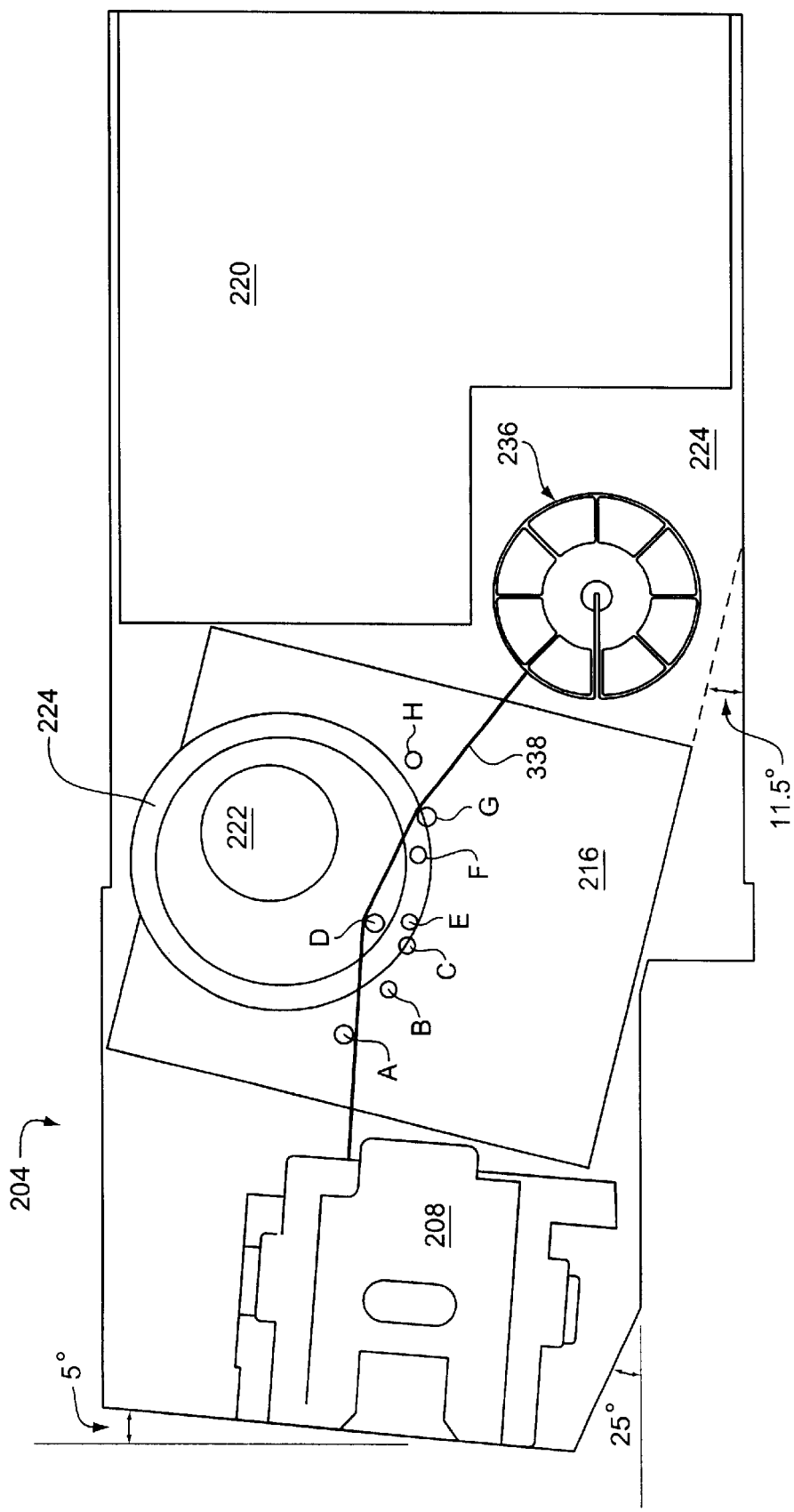
FIG. 11 is a simplified top view of the helical transport of the invention illustrating the dimensions and pre-loading tape path.

FIG. 11 also illustrates the tape path 338. During the pre-load operation performed by linear threading mechanism 218, the leader block of the tape is pulled under guide post A; over guide posts B, C, D, E, F and G; under guide post H; and into take-up reel 236. Guide posts A and H are fixed position guide posts of helical deck 216. Guide posts E and F are mounted on loading ring 224 and move therewith to load the tape around helical head 222 for data read/write operations. Guide post G is part of the incline post assembly of helical deck 216. Guide post D is a fixed post added by the inventors. It is not part of the Panasonic D350 helical deck.

As discussed above, once the pre-load operation is complete, tape control can be turned over to helical deck 216. Helical deck 216 may then load the tape around head 222 as is known in the art.

The transport of the invention has been described in the environment of a Storage Technology Corporation Model 4400 ACS. It will be apparent to a person skilled in the art, however, that the transport of the invention may be used with other automated cartridge systems. These include the Storage Technology Corporation WOLFCREEK™ ACS, the Storage Technology Corporation POWDERHORN™ ACS, and the 3495 ACS available from IBM Corporation, Armonk, N.Y. Each of these ACS's currently store data in a longitudinal recording format on a 3480 cartridge. Moreover, the transport of the invention may be used with any single reel tape cartridge and is not limited to the 3480-style cartridge.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A helical scan transport apparatus for reading and writing data on to a magnetic recording tape which is wound on a supply reel rotatably mounted within a removable tape cartridge, wherein the tape has a leader block attached to one end for use in withdrawing the end from the tape cartridge, the transport apparatus comprising:

a chassis having a front end portion and a rear end portion;

an elevator assembly mounted on said chassis at said front end portion, said elevator assembly configured to receive the tape cartridge and to position the tape cartridge in a loaded position;

a take-up reel assembly coupled to said chassis at said rear end portion;

a helical deck mounted on a central portion of said chassis between said elevator assembly and said take-up reel assembly, said helical deck including a rotary read/write head, a substantially linear tape loading path between said elevator assembly and said take-up reel assembly, and a movable guide for seizing the tape from said tape loading path and for at least partially wrapping the tape around said rotary head; and a raised linear threading mechanism, including a linear bearing, a threading arm, and a threading cam, wherein said bearing, said arm, and said cam are operably configured to grasp the leader block of the tape, thread the tape through said tape loading path of said helical deck, and couple said leader block to said take-up reel assembly.

2. The helical scan transport apparatus of claim 1, further comprising a supply reel drive assembly co-located with said elevator assembly, said supply reel drive assembly configured to couple with the supply reel of the cartridge and to rotatably drive the supply reel.

3. The helical scan transport apparatus of claim 2, wherein said take-up reel assembly comprises a take-up reel and a servomotor coupled to said take-up reel.

4. A helical scan transport apparatus for reading and writing data on to a magnetic recording tape which is wound on a supply reel rotatably mounted within a removable tape cartridge, wherein the tape has a leader block attached to one end for use in withdrawing the end from said tape cartridge, the transport apparatus dimensioned to fit within a rectangular enclosure measuring approximately twelve and one-half inches wide by twenty-six and one-half inches deep and configured such that a plurality of the transport apparatuses may be stacked within the enclosure with a vertical spacing of eleven inches on center, the transport apparatus and enclosure for use with an automated cartridge system, the apparatus comprises:

- a chassis having a front end portion and a rear end portion, said front end portion extending seven inches outward from the enclosure and configured to mate with the automated cartridge system when said enclosure is coupled to a housing of the automated cartridge system;
- an elevator assembly mounted on said chassis at said front end portion, said elevator assembly configured to receive a tape cartridge from the automated cartridge system and to position the tape cartridge in a loaded position;
- a take-up reel assembly coupled to said chassis at said rear end portion;
- a helical deck mounted on a central portion of said chassis between said elevator assembly and said take-up reel assembly, said helical deck including a rotary read/write head, a substantially linear tape loading path between said elevator assembly and said take-up reel assembly, and a movable guide for seizing the tape from said tape loading path and for at least partially wrapping the tape around said rotary head; and
- a raised linear threading mechanism, including a linear bearing, a threading arm, and a threading cam,
- wherein said bearing, said arm, and said cam are operably configured to grasp the leader block of the tape, thread the tape through said tape loading path of said helical deck, and couple said leader block to said take-up reel assembly.

5. The helical scan transport apparatus of claim 4, further comprising a supply reel drive assembly co-located with said elevator assembly, said supply reel drive assembly configured to couple with the supply reel of the cartridge and to rotatably drive the supply reel.

6. The helical scan transport apparatus of claim 5, wherein said take-up reel assembly comprises a take-up reel and a servomotor coupled to said take-up reel.

7. In combination:

- a single reel cartridge;
- a take-up reel;
- a helical tape deck;
- a substantially linear tape threading path for threading tape from the single reel cartridge, through the helical tape deck, to the take-up reel; and
- a raised linear threading mechanism, including a threading arm and a threading cam, wherein said threading arm and said threading cam are operably configured to grasp a leader block of the tape, thread the tape through said tape threading path of said helical deck, and couple said leader block to said take-up reel.

* * * * *